(12) United States Patent
Forster

(10) Patent No.: US 6,369,772 B1
(45) Date of Patent: Apr. 9, 2002

(54) REFLECTOR CIRCUIT

(75) Inventor: Ian J Forster, Chelmsford (GB)

(73) Assignee: Marconi Caswell Limited (GB)

( * ) Notice: Subject to any disclaimer, the term of this patent is extended or adjusted under 35 U.S.C. 154(b) by 0 days.

(21) Appl. No.: 09/674,098

(22) PCT Filed: Apr. 26, 1999

(86) PCT No.: PCT/GB99/01285

§ 371 Date: Jan. 3, 2001

§ 102(e) Date: Jan. 3, 2001

(87) PCT Pub. No.: WO99/56149

PCT Pub. Date: Nov. 4, 1999

(30) Foreign Application Priority Data

Apr. 25, 1998 (GB) ............................................ 9808762

(51) Int. Cl.⁷ ................................................ H01Q 1/50
(52) U.S. Cl. ...................................... 343/850; 455/106
(58) Field of Search ................................. 343/850, 853, 343/865; 455/104, 106; 342/51, 203

(56) References Cited

U.S. PATENT DOCUMENTS

| | | | | |
|---|---|---|---|---|
| 4,350,982 A | | 9/1982 | Alpers | 343/6.8 R |
| 4,358,763 A | * | 11/1982 | Strauch | 343/55 |
| 5,469,170 A | | 11/1995 | Mariani | 342/51 |
| 5,530,451 A | | 6/1996 | Richardson | 342/203 |
| 5,822,685 A | * | 10/1998 | Forster | 455/106 |

FOREIGN PATENT DOCUMENTS

| | | | |
|---|---|---|---|
| EP | 0 486 367 A1 | 5/1992 | G01S/13/82 |
| FR | 2 573 542 A | 5/1986 | G01S/13/80 |
| GB | 2 051 522 A | 1/1981 | H04B/1/59 |
| GB | 2 274 374 A | 7/1994 | H04K/1/00 |
| GB | 2 284 323 A | 5/1995 | G01S/13/82 |
| GB | 2 318 011 A | 4/1998 | G06G/7/78 |
| RU | 2070727 | 12/1996 | G01S/13/74 |

* cited by examiner

*Primary Examiner*—Don Wong
*Assistant Examiner*—Hoang Nguyen
(74) *Attorney, Agent, or Firm*—Kirschstein, et al.

(57) ABSTRACT

A reflector circuit is provided which responds to illuminating radiation with corresponding output radiation of increased magnitude relative to the illuminating radiation. The circuit comprises an antenna for receiving the illuminating radiation and emitting corresponding output radiation, a delay line providing a frequency selective limiting and signal storage characteristic and an amplifier assembly incorporating a reflection amplifier for providing signal amplification. The reflection amplifier is capable of providing high gains approaching +30 dB at relatively low current consumption, for example, tens of microamperes. The antenna provides an input signal upon receipt of the illuminating radiation, a portion of which is amplified, frequency selectively filtered, and then stored for a period after which it is emitted as the output radiation from the circuit. Switches may be incorporated and are operable to counteract spontaneous oscillation within the circuit.

28 Claims, 6 Drawing Sheets

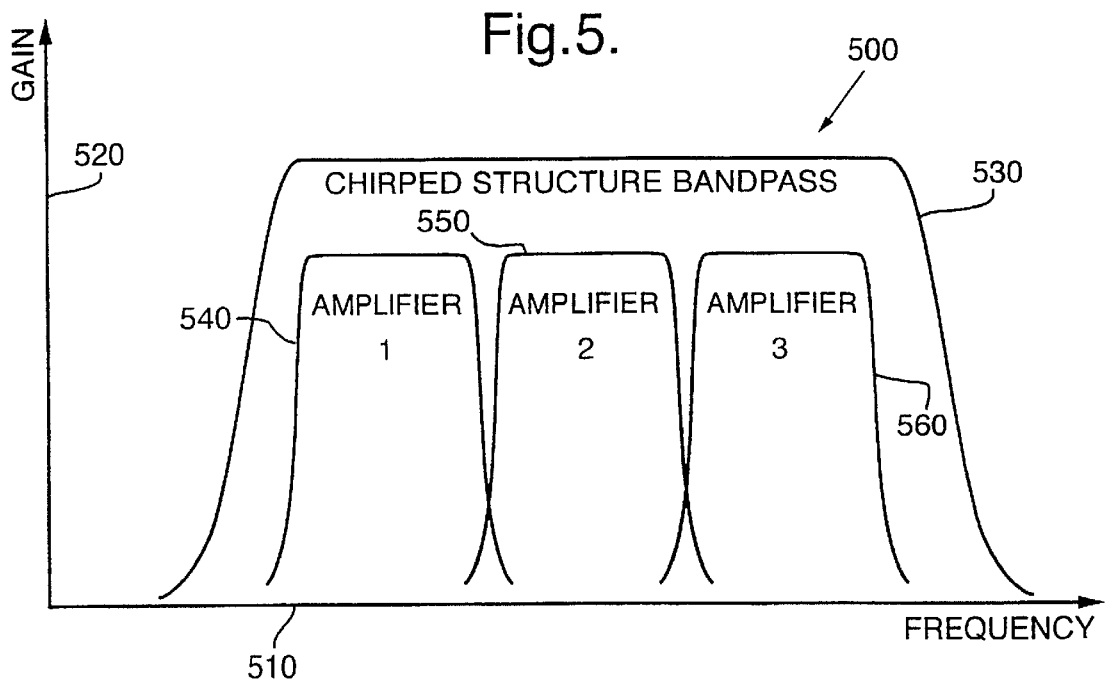
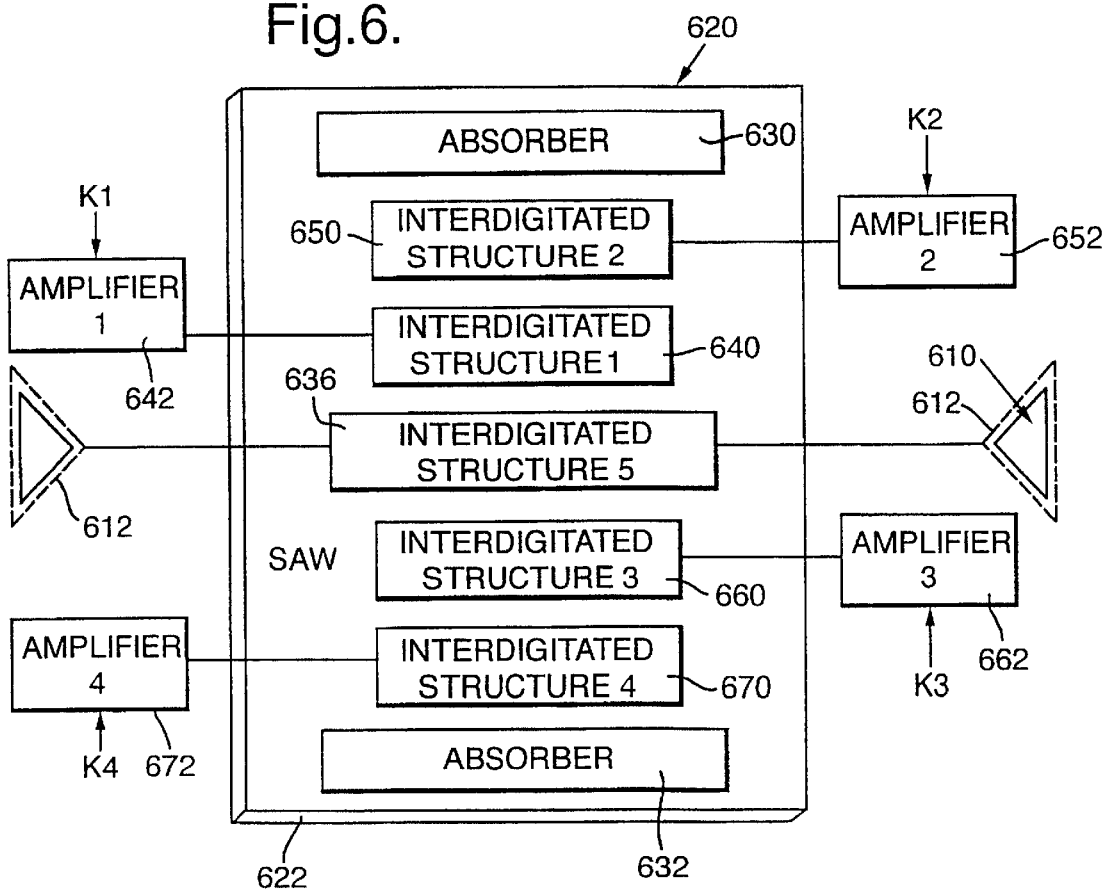

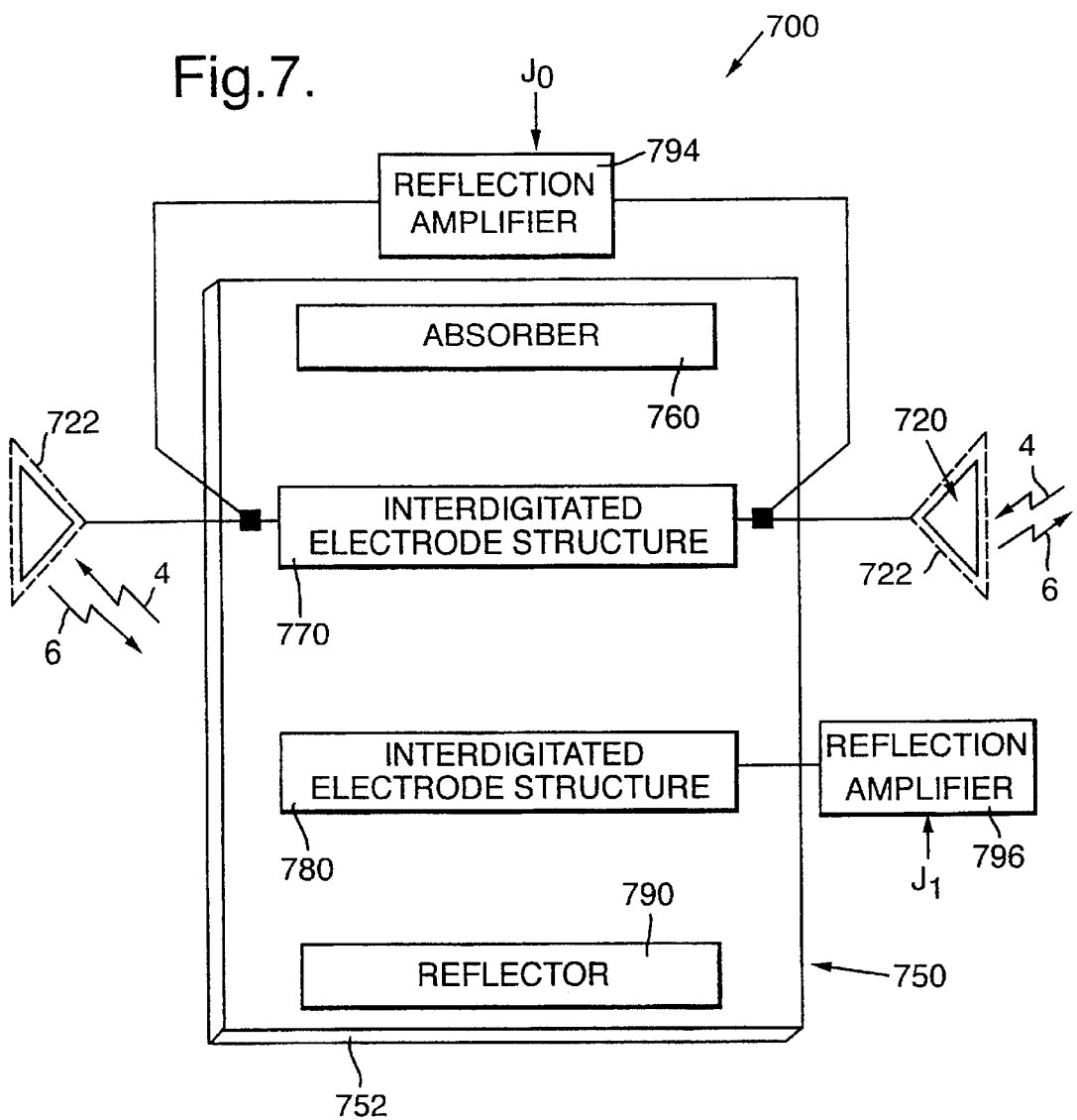
Fig.7.
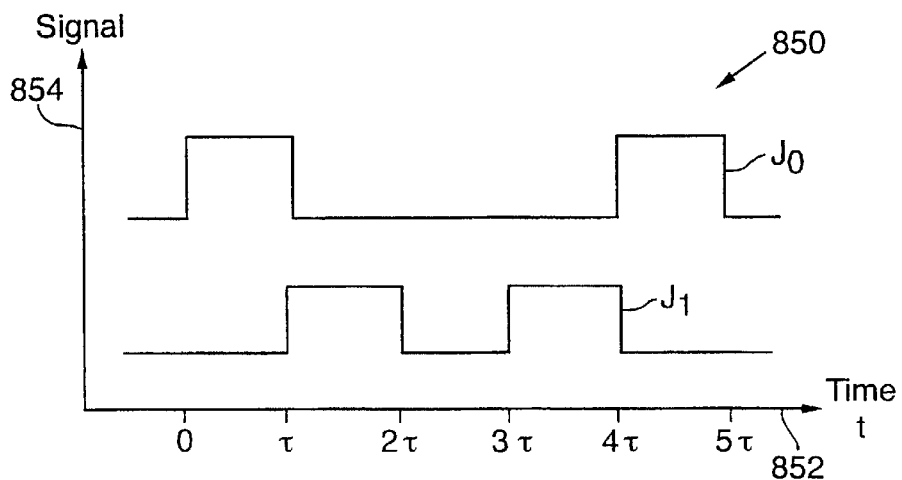

REFLECTOR CIRCUIT

BACKGROUND OF THE INVENTION

This invention relates to a reflector circuit for receiving illuminating radiation and emitting corresponding amplified output radiation in response; the invention is particularly, although not exclusively, concerned with a transponder circuit for use in a pseudo passive transponder (PPT) tag.

One type of reflector circuit, namely a conventional PPT, uses a diode detector to detect incoming radiation from an interrogating source. The diode can be operated as a modulated reflector by modulating a bias potential applied thereto with an information carrying signal such that the PPT reflects incoming radiation back to the source as modulated reflected radiation. Since the conventional PPT does not incorporate an amplifier in association with the diode, the reflected radiation is of reduced amplitude with respect to the incoming radiation; this limits a useful range over which the PPT can respond for a given radiation output from the source and given minimum detection threshold level for reflected radiation received at the source. The PPT responds to incoming radiation by emitting corresponding reflected radiation with an efficiency referred to as its "conversion efficiency". This conversion efficiency is defined as a ratio of the carrier radiation power received at the PPT to sideband radiation of the reflected radiation emitted from the PPT. For the conventional PPT described above, the conversion efficiency is typically −8 dB or less which necessitates use of radiation output power from the interrogating source of, for example, tens of milliwatts to achieve a useful operating range from the source to the PPT of a few meters.

This operating range is too short for many applications where it is, for example for safety reasons, impermissible to employ a greater radiation output power level from the source. This problem is addressed by incorporating a transmission amplifier into the PPT to amplify radiation received thereat and thereby emit more radiation back to the interrogating source. However, inclusion of the transmission amplifier into the convention PPT results in it consuming more power which then requires the PPT to employ larger batteries, to have its batteries replaced more frequently or employ a more powerful power supply. This is a major drawback when the PPT has to be compact, for example of similar size to a plastic credit card or retailing tag affixed to products.

Examples of pseudo continuous wave radar transponders, namely types of reflector circuit, are described in a UK Patent number GB 2 051 522A. One radar transponder described therein incorporates an antenna assembly and a transmission radio frequency (r.f.) amplifier for enhancing conversion efficiency of the transponder. Since it is difficult to prevent an r.f. amplifier coupled to an antenna assembly for receiving incoming radiation and emitting corresponding amplified output radiation from spontaneously oscillating, especially if the amplifier is providing in excess of +30 dB gain, the transponder additionally incorporates a delay line and associated switches controlled from a clock generator to counteract spontaneous oscillation. In operation, incoming radiation is received at the antenna assembly and converted thereat to a received signal which is then sampled by one of the switches, amplified by the amplifier, stored in the delay line for a period of time, further amplified by the amplifier before finally being emitted as reflected radiation from the antenna assembly. Inclusion of the switches, the delay line and the transmission amplifier makes the transponder more costly and complex than the conventional PPT with diode detector described above. Moreover, the switches and the amplifier consume significant power in operation. Furthermore, it is not always practicable to decrease power consumption of the transmission amplifier further without sacrificing its signal gain.

SUMMARY OF THE INVENTION

The inventor has appreciated that it is therefore desirable in a reflector circuit incorporating one or more amplifiers to enhance its conversion efficiency and arrange for the circuit to be simpler and consume less power during operation compared to prior art reflector circuits.

Thus the present invention has arisen in an endeavour to provide a reflector circuit which is capable of consuming less power during operation compared to prior art reflector and transponder circuits, and capable of employing fewer component parts.

According to the present invention, there is provided a reflector circuit for receiving illuminating radiation and emitting corresponding amplified output radiation, the circuit comprising:

an antenna assembly for receiving the illuminating radiation and providing a corresponding received signal, and processing means for amplifying and storing a portion of the received signal for a period of time for use in generating a corresponding output signal for emission from the antenna assembly as the output radiation, in which the processing means incorporates reflection amplifying means for amplifying the portion of the received signal.

The invention provides the advantage that the reflection amplifying means is capable of providing enhanced power gains using few component parts and consuming relatively less power compared to transmission amplifiers used in the prior art.

Advantageously, the amplifying means comprises a reflection amplifier incorporating solely a field effect transistor, namely a silicon JFET or a GaAs device, together with a feedback arrangement to operate it within a linear region of its current/voltage characteristic such that it reflects a signal received thereat with an increased magnitude. In this mode of operation, high reflection gains in excess of +30 dB are, for example, achievable for a low transistor current consumption of a few microamperes. Such a low current consumption makes it possible for the reflection amplifier to operate for many months continuously on power supplied from button cells as frequently used, for example, in electronic wrist watches. Moreover, such a low current consumption is not achievable if a transmission amplifier were used instead of the reflection amplifier. Moreover, the transmission amplifier would have a more complex circuit configuration compared to that of the reflection amplifier.

In the reflector circuit of the invention, a reflection amplifier would be expected to be unstable and spontaneously oscillate. However, by careful choice of impedance matching, reflections of signals from components directly connected to the amplifier can be arranged to be in antiphase at the amplifier, thereby counteracting spontaneous oscillation therein. This drawback is not so significant for transmission amplifiers because of their associated input-output isolation.

Since the reflection amplifying means is capable of providing a high power gain in excess of +30 dB, the reflector circuit of the invention is susceptible to spontaneous oscillation as arises in the prior art transponders and reflector circuits incorporating transmission amplification; this arises despite careful choice of impedance matching. Thus, in a preferred embodiment of the invention, the reflector circuit can incorporate gain controlling means for switching the reflection amplifying means alternately between a relatively more reflecting state and a relatively less reflecting state, thereby operable to counteract spontaneous closed-loop oscillation within the circuit. This provides the advantage that susceptibility of the circuit to spontaneous oscillation can be reduced without there being a need to incorporate signal directing switches as employed in the prior art.

In a preferred embodiment of the invention, the reflection amplifying means conveniently comprises a reflection amplifier incorporating a transistor configured by means of a feedback arrangement to operate within different portions of the transistor's current/voltage characteristics, thereby operating the relatively more reflecting state and the relatively less reflecting state. This provides the advantage of being a relatively simple manner to provide interrupted gain within the reflection amplifying means without needing to use signal directing switches as in the prior art.

In order to counteract spontaneous oscillation within the reflector circuit, it can be operated so that the amplifying means is in a less reflecting state when re-reflected signals arising from imperfect impedance matching at the antenna assembly are reflected back to the amplifying means. The processing means may therefore advantageously employ storing means for delaying signals propagating to and from the amplifying means so that the gain controlling means is provided with sufficient time to periodically reduce gain provided by the amplifying means to counteract spontaneous oscillation within the circuit. Thus, in a preferred embodiment of the invention, the processing means advantageously incorporates storing means for storing the portion of the signal for use in generating the output signal, the storage means connected in a signal path between the reflection amplifying means and the antenna assembly.

In some situations, the reflector circuit may be simultaneously interrogated by several sources emitting radiation at mutually different frequencies, one or more of the sources emitting sufficiently strongly to cause overload, saturation or distortion within the circuit. This can prevent the circuit from responding effectively to those sources emitting radiation more weakly which do not give rise to such effects. The circuit can therefore be arranged so that the processing means is operable to provide frequency selective amplification in response to the magnitude of components present in the illuminating radiation. This provides the advantage that the processing means selectively reduces its amplification for components in the received signal which are likely to give rise to overload, saturation or distortion in the circuit.

If the reflector circuit responds non-progressively when the magnitudes of components in the illuminating radiation exceed a threshold power level at which the circuit selectively modifies its response to counteract overload or provide compression, a problem of spurious circuit response can arise. The circuit can therefore be arranged to provide amplification which progressively reduces in response to increased magnitude of components in the illuminating radiation. This provides an advantage that spurious circuit response is reduced when the magnitude of components in the illuminating radiation is substantially similar to the threshold power level.

In order to obtain a relatively compact and simple reflector circuit, it is desirable that components incorporated therein simultaneously provide a number of different functions. Therefore, in the transponder circuit, the storing means advantageously incorporates a magnetostatic wave device arranged to store the portion of the signal for use in generating the output signal and to provide the frequency selective response. This provides the advantage that the device performs two functions simultaneously.

Conveniently, the magnetostatic device provides a signal propagation path through an epitaxial Yttrium Iron Garnet magnetic film having a thickness in a range of 10 $\mu$m to 100 $\mu$m for storing the portion of the signal and providing a frequency selective response. This provides the advantage of being an inexpensive and compact manner to provide the selective response.

Conveniently, the antenna assembly comprises a first antenna element for receiving the illuminating radiation and a second antenna element for emitting the output radiation, said first and second antenna elements being mutually spatially separate. This provides the advantage that input and output from the circuit are isolated to a greater degree, thereby counteracting susceptibility of the circuit to oscillate spontaneously.

The antenna assembly preferably incorporates one or more of a patch antenna, a bow tie dipole antenna and a travelling wave antenna. These provide the advantage of being compact and suitable for use at radio frequencies in a frequency range of several GHz.

BRIEF DESCRIPTION OF THE DRAWINGS

Embodiments of the invention will now be described by way of example only, with reference to the following diagrams in which:

FIG. 5 provides an illustration of passband characteristics of the reflector circuit shown in FIG. 4;

FIG. 6 is a schematic of a reflector circuit in accordance with a fourth embodiment of the invention; and FIG. 7 is a schematic of a reflector circuit in accordance with a fifth embodiment of the invention.

DETAILED DESCRIPTION OF THE PREFERRED EMBODIMENTS

Figure 1:
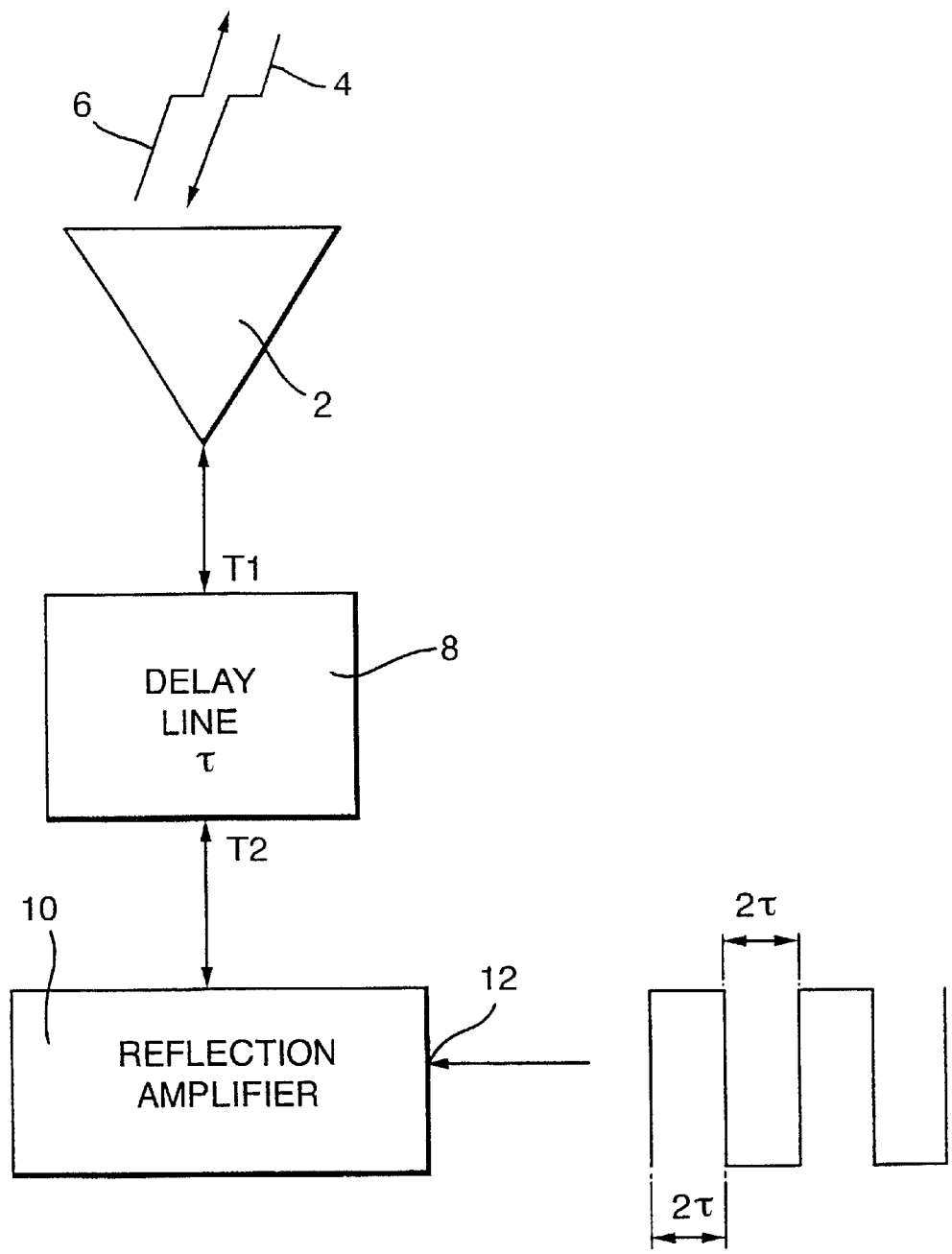
FIG. 1 is a schematic of a reflector circuit in accordance with a first embodiment of the invention.

Referring to FIG. 1, there is indicated generally by 1 a reflector circuit for operation at microwave frequencies, for example in a frequency range of 1 GHz to 4 GHz although operation at other frequencies is possible. The circuit 1 comprises an antenna 2 for receiving illuminating radiation 4 and for emitting output radiation 6. The antenna 2 is connected to a delay line 8 which is in turn connected to a reflection amplifier 10. The delay line 8 is operable such that it delays a signal passing therethrough by a time period t=$\tau$. The antenna 2 can comprise one or more of a patch antenna, a bow tie dipole antenna, a resistively loaded travelling wave antenna or any broadband antenna suitable for operation at the described frequency. Different types of antennae described above can be used in combination to achieve specific polar gain responses for the circuit 1 when receiving the illuminating radiation 4 and emitting the output radiation 6.

Operation of the circuit 1 will now be described with reference to FIG. 1. In an initial state, namely t=0, continuous wave illuminating radiation 4 is incident on the circuit 1 and the reflection amplifier 10 has just switched to a reflecting state in which it provides amplification. The radiation 4 is received by the antenna 2 which converts it to an input signal which passes into the delay line 8 through which it propagates as a wave for a time period $\tau$ after which it is output therefrom at a time $t=\tau$ to reach the reflection amplifier 10. At the time $t=\tau$, the reflection amplifier 10 remains in its reflecting/amplifying state and consequently reflects and amplifies the signal as a reflected signal which propagates back through the delay line 8 to the antenna 2 to be emitted as the output radiation 6. At a time $t=2\tau$ when the start of the reflected signal reaches the antenna 2 for emission therefrom, the reflection amplifier 10 switched to a relatively less reflecting state where it provides insufficient amplification for supporting spontaneous oscillation within the circuit 1.

The delay line 8 is a magnetostatic wave delay line (MWDL) which is highly advantageous due to its non-linear and frequency selective signal transmission characteristics. Although the delay line 8 is a broadband device, with a typically 1 GHz passband between 2 and 3 GHz, it exhibits a narrowband limiting characteristic dependent on materials employed for its fabrication. The delay line 8 operates by supporting of volume mode of radiation propagation therethrough.

The delay line 8 provides a signal propagation path through a magnetic medium, namely through a magnetic film of epitaxially deposited Yttrium Iron Garnet (YIG) on an alumina or sapphire substrate, the film having a film thickness in a range of 10 $\mu$m to 100 $\mu$m. The delay line 8 further incorporates transducers for coupling signals applied to the delay line 8 to generate corresponding magnetic waves propagating along the film, and for coupling waves in the film to generate corresponding signals for output from the delay line 8. The delay line 8 further comprises a magnet for applying a magnetic field to the film for aligning magnetic dipoles therein during its operation, thereby providing magnetic anisotropy in the film.

The delay line 8 provides a signal limiting transmission characteristic when the signals having a relatively increased amplitude are applied thereto. Limiting occurs when at a given input signal power into the delay line 8, further increase of the input power does not give rise to a corresponding increase in output signal power therefrom; for example, a 3 dB increase in input power results in a corresponding 1 dB increase in output power when limiting occurs. Limiting thus occurs progressively in the delay line 8 in relation to power when the input signal power exceeds a limiting threshold power level.

However, limiting in the delay line 8 is different from that which occurs in a diode limiter for example. In the case of a diode limiter, the limiter responds to total power in an input signal over its bandwidth applied thereto. Thus, a relatively stronger first component of an input signal applied to the diode limiter which is 10 dB above its limiting threshold will, for example, be attenuated by an extra 10 dB, but a simultaneously present relatively smaller second component of the input signal both at a different frequency in the passband of the limiter relative to the first component will also be correspondingly attenuated by the extra 10 dB.

The delay line 8 functions in a different manner compared to the diode limiter described above; the delay line 8 independently limits components in an input signal applied thereto and propagating therethrough whose frequencies are more than a few MHz apart. This means that a stronger signal component at a first frequency in the input signal will be limited to a known level by attenuation thereof without causing corresponding attenuation of a weaker signal component at a second frequency in the input signal, the first and second frequencies being mutually different.

In the circuit 1, reflection amplifier 10 comprises a field effect transistor (FET), namely a silicon JFET or a GaAs device, selected to suit an operating frequency range over which the reflector circuit is to function. As described in our UK Patent GB 2 284 323B, whose contents are hereby incorporated by reference, the transistor is configured by means of a feedback arrangement such as to operate within a linear region of its current/voltage characteristic such that it reflects a signal received thereat with an increased magnitude. In this mode of operation, the transistor behaves as a negative resistance. By further operating the transistor in a non-linear relatively lower gain region of its current/voltage characteristics, it is operable as a detector for detecting modulation conveyed in the signal applied thereto.

Figure 2:
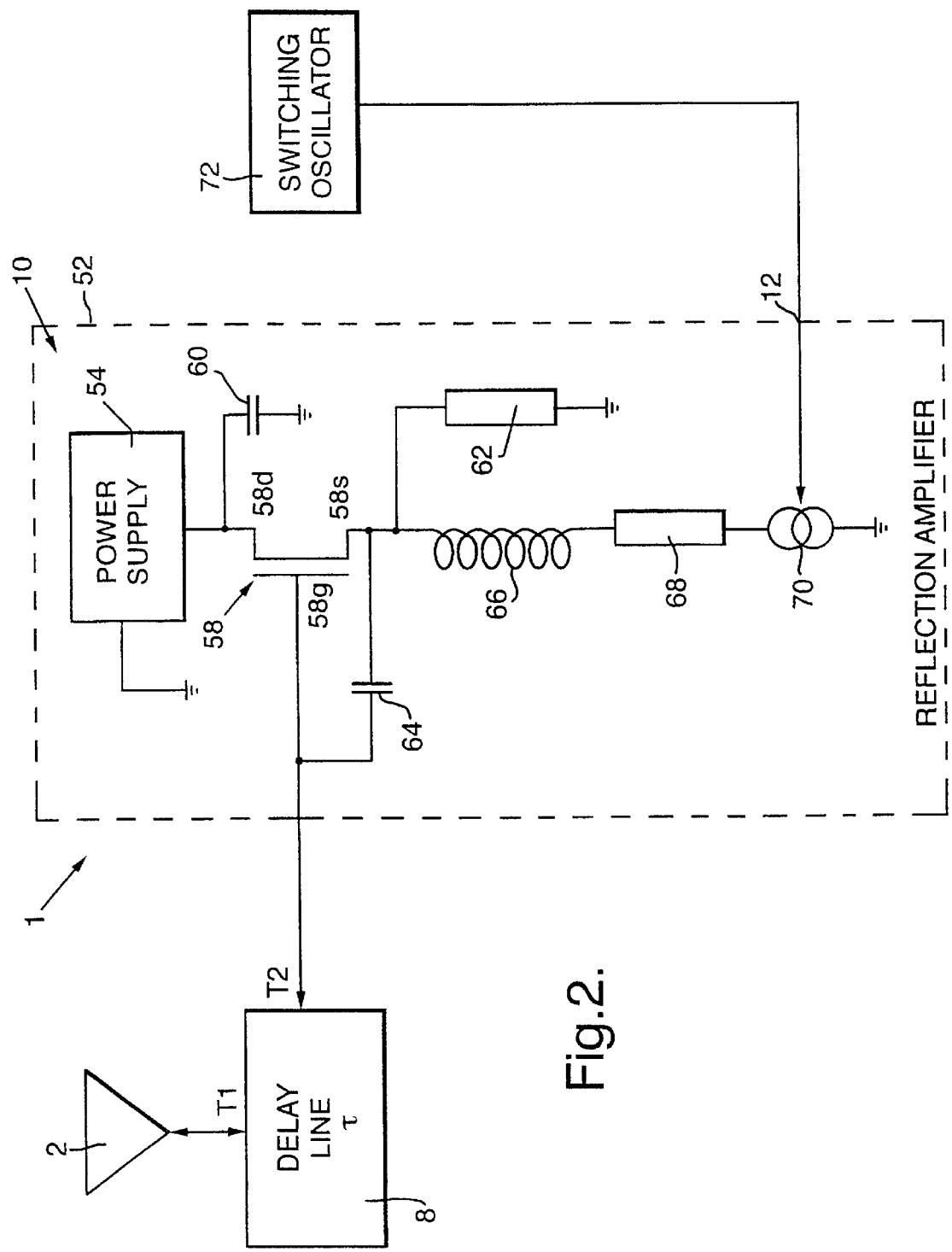
FIG. 2 is a schematic of a reflection amplifier incorporated into the reflector circuit shown in FIG. 1.

Referring now to FIG. 2, there is shown the reflection amplifier 10 in greater detail contained within a dotted line 52. The amplifier 10 incorporates a power supply 54, a silicon or GaAs transistor 58, a capacitor 60 and a resistor 62 forming a termination network for the transistor 58, a feedback capacitor 64, an inductor 66 and a resistor 68 forming a bias network, and a controllable current source 70.

The delay line 8 incorporates two signal connection ports T1, T2; the port T1 is connected to the antenna 2, and the port T2 is connected to a gate electrode 58g of the transistor 58 and to a first terminal of the capacitor 64. The power supply 54 is connected to a drain electrode 58d of the transistor 58 and also to a first terminal of the capacitor 60; a second terminal of the capacitor 60 is connected to a signal ground. The capacitor 64 provides a second terminal which is connected to a source electrode 58s of the transistor 58, to the resistor 62 which is grounded, and through the inductor 66 and the resistor 68 in series to the source 70. A switching oscillator 72 is also connected to the source 70 to provide a square wave switching signal thereto.

Operation of the reflection amplifier 10 is controlled by the square wave signal generated in the switching oscillator 72 which is applied to an input 12 of the amplifier 10; the signal alternately switches the amplifier 10 between relatively more reflecting and relatively less reflecting states by controlling a drain/source current of the transistor 58 such that it alternately operates within different regions of its current/voltage characteristics. It will be appreciated by those skilled in the art that other methods of controlling the amplifier 10 can be used, for example a potential provided by the power supply 54 can be modulated by the square wave signal.

The reflection amplifier 10 and its associated components shown within the dotted line 52 are capable of providing a high power gain approaching +30 dB for a drain/source current through the transistor 58 of the order of a few tens of microamperes; such high gain is provided when the transistor 58 is operable in the relatively more reflecting state. Such a high power gain is not achievable from a transmission amplifier operating on such low supply currents.

During operation of the circuit 1, reflective amplification provided by the reflection amplifier 10 is activated and de-activated in a switched fashion with a period of $4\tau$ where $\tau$ is a time period required for a signal applied to the delay line 8 to propagate therethrough as a wave and then be reconstituted as a signal. Introducing a time delay of duration τ for signal propagation between the antenna 2 and the amplifier 10 ensures that any signal which is reflected by the antenna 2 towards the amplifier 10 on account of imperfect impedance matching at the antenna 2 arrives back at the amplifier 10 when it is in a relatively less reflecting state thereby counteracting spontaneous oscillation within the circuit 1.

The output radiation 6 comprises a number of radiation components, namely a carrier component whose frequency is determined by the frequency of the illumination radiation 4, together with sideband radiation components whose frequencies are offset from the frequency of the illumination radiation 4 by a frequency difference $f_{sideband}$ determined by the period τ according to Equation 1:

$$f_{sideband} = \frac{n}{4\tau} \qquad \text{Eq. 1}$$

where n is an odd integer. Components of relatively greatest amplitude occur for n=1.

Because the square wave signal generated in the switching oscillator 72 for controlling the amplifier 10 contains Fourier harmonic components at frequencies of $$\frac{m}{4\tau}$$

where m=1, 3, 5, 7 . . . , the output signal provided to the antenna 2 will predominantly contain sidebands of frequencies of $$\frac{m}{4\tau}$$

from the carrier frequency.

Although the antenna 2 and the reflection amplifier 10 are arranged to be mutually impedance matched as closely as possible, a small proportion of the reflected signal will be reflected by the antenna 2 as a re-reflected signal back through the delay line 8 to the reflection amplifier 10.

However, the reflection amplifier 10 is still in its relatively non-reflecting state when the re-reflected signal reaches the reflection amplifier 10 at a time t=3τ and the amplifier 10 will remain in this state until a time t=4τ. Thus, assuming that the reflection amplifier 10 when in its relatively non-reflecting state is properly impedance matched to the delay line 8, unwanted re-reflected signals from the antenna 2 will be incident on the reflection amplifier 10 only while it is in its relatively non-reflecting state.

This mode of operation of the circuit 1 ensures that relatively high levels of reflection gain approaching +30 dB can be obtained from the amplifier 10 irrespective of antenna 2 impedance matching with associated reduced likelihood of spontaneous self-oscillation arising within the circuit 1. Since the reflector circuit 1 contains only the reflection amplifier 10 for providing amplification, these high levels of gain can be achieved at circuit 1 operation current consumption in the order of a few tens of microamperes.

When the circuit 1 simultaneously receives several components of radiation in the illuminating radiation 4, one or more of which have sufficient power to cause overload in the circuit 1 if it were providing its unattenuated nominal amplification, the delay line 8 will selectively provide attenuation at frequencies of those overloading components to counteract their overloading effect on the amplifier 10. It is advantageous to avoid overload because non-linear signal mixing can occur within the amplifier 10 giving rise to a complex and potentially confusing spectrum of radiation components emitted from the antenna 2, for example intermodulation artefacts. As described in the foregoing, the delay line 8 provides such attenuation selectively and progressively when the power of a radiation component received at the circuit 1 exceeds a threshold power level.

This characteristic is advantageous when the reflector circuit 1 is, for example, incorporated into a marine buoy where it may be interrogated simultaneously from several marine vessels at varying distances therefrom. In order to avoid overload in the circuit 1 and thereby counteract a situation where one or more of the vessels fail to recognise the buoy, the delay line is by virtue of its selective attenuation effective to reduce overload, thereby ensuring that the buoy is detectable by all the vessels, irrespective of whether or not they simultaneously interrogate it.

When the circuit 1 simultaneously receives several components of radiation in the illuminating radiation 4, one or more of which have sufficient power to exceed the threshold power level if it were providing its unattenuated nominal amplification but not cause overload, the delay line 8 will also selectively reduce amplification for these stronger components thereby providing the circuit 1 with a selective signal compression characteristic. This characteristic is useful when the circuit 1 is, for example, interrogated from relatively distant and closer sources where only weaker output radiation is required for responding to the closer sources and stronger output radiation is required for the distant sources.

Transmission losses through the delay line 8 must be less than 7.5 dB when the reflection amplifier 10 provides a reflection gain of 25 dB to achieve a magnitude of more than 0 dB for sideband radiation components contained in the emitted output radiation 6.

Figure 3:
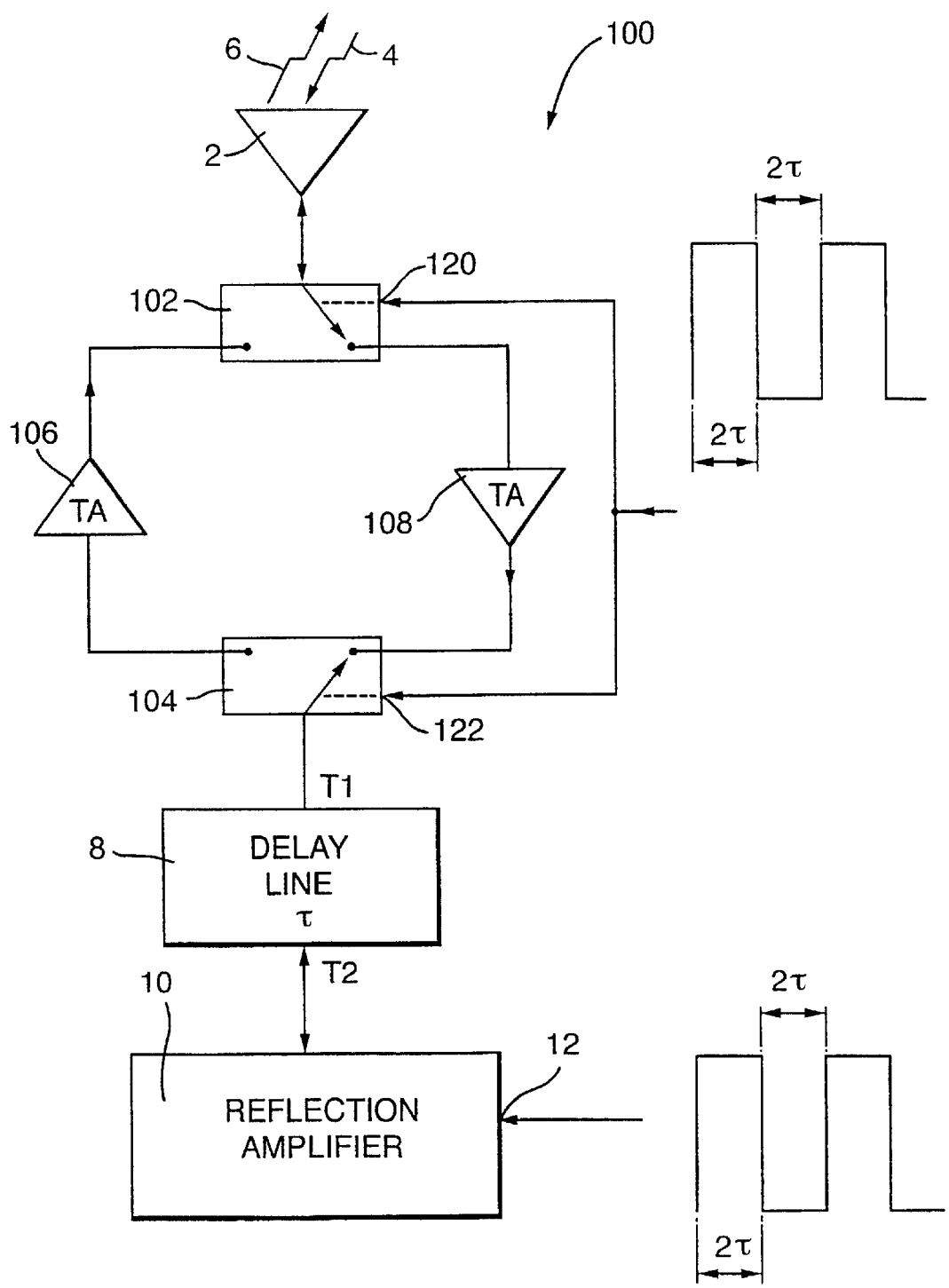
FIG. 3 is a schematic of a reflector circuit in accordance with a second embodiment of the invention.

A reflector circuit according to the invention which is less dependant on the delay line loss is shown in FIG. 3 and indicated by 100. The circuit 100 incorporates the circuit 1 and additionally includes a pair of switches 102, 104 and a pair of transmission amplifiers 106, 108. Because the reflection amplifier 10 provides most of the amplification in the circuit 100, the transmission amplifiers 106, 108 provide relatively less gain, for example 10 dB, primarily to overcome delay line losses and therefore do not consume supply currents in excess of 100 μA. Substituting the reflection amplifier 10 with one or more transmission amplifiers providing comparable gain would result in a considerable increase in circuit current consumption. The switches 102, 104 and the amplifiers 106, 108 are inserted between the antenna 2 and the delay line 8 of the circuit 1 shown in FIG. 1. The switches 102, 104 are controlled by respective control inputs 120, 122 to which a square wave signal, having a period of 2τ, is applied. The square wave signal is synchronised to that provided by the oscillator 72 to the reflection amplifier 10. The two switches 102, 104 define two signal paths, namely first and second signal paths, between the antenna 2 and the delay line 8 in the circuit 100. Operation of the circuit 100 is essentially the same as that described above for the circuit 1 in FIG. 1. In the circuit 100, the effect of the delay line loss is eliminated because:

(i) the input signal generated at the antenna 2 in response to it receiving the illuminating radiation 4 is amplified by the transmission amplifier 108 before being applied to the delay line 8; and (ii) a reflected and amplified signal from the reflection amplifier 10 having passed through the delay line 8 then passes down the second path where it is amplified by the transmission amplifier 106 before being applied to the antenna 2 for emission as radiation therefrom.

In the embodiments of the invention described above, the circuits 1, 100 can be further modified to apply data modulation so that the output radiation 6 becomes modulated with data. Such modulation can comprise one or more of amplitude, frequency and phase modulation. For each type of modulation employed, the output radiation 6 can be "on-off keyed" such that associated sidebands arising from the additional modulation will occur at a frequency offset from the frequency of the illumination radiation 4 as provided by Equation 2 and 3:

$$f_{sideband} = \frac{1}{4\tau} \qquad \text{Eq. 2}$$

$$f_{sideband} = \frac{1}{2\tau} \qquad \text{Eq. 3}$$

where Eq. 2 and Eq. 3 pertain to amplitude and frequency/phase modulation respectively. It will be appreciated that the power of the sidebands as provided by Eq. 1 data-modulated operation can be reduced when the modulation is applied. The level of this reduction will be dependent on the modulation technique used and the data rate being transmitted.

Data modulation described above may also include modulation using an analogue information bearing signal, for example an analogue pilot tone, specific to the reflector circuit, thereby enabling an interrogating source to identify which category of reflector circuit is providing a response thereto by decoding the data modulation applied to radiation received thereat.

A reflector circuit according to the invention provides a significant increase in reflection gain for comparable power consumption relative to prior art reflector circuits, thereby making it ideally suited for use in pseudo-passive transponder tags. As a consequence, it is possible to operate such a tag incorporating a reflector circuit of the invention over much greater distances for a given level of illuminating radiation carrier power than prior art tags. Moreover, advantageously, its frequency selective properties counteract overload in the tag when interrogated simultaneously by closer and remoter interrogating sources operating at mutually different frequencies and providing widely different illuminating radiation powers at the tag.

Due to its very high reflection gain, for example approaching +30 dB, the circuits 1, 100 present a very large radar cross section making them ideally suited for use as radar chaff or radar marker beacons. In such applications, the time delay τ is selected to be as short as possible to ensure that the sidebands are displaced from the carrier frequency of illuminating radiation applied thereto as far as possible or at least sufficiently for such that they lie outside the bandwidth of a radar system providing the illuminating radiation.

It will be appreciated that, in each of the embodiments of the invention described, there is incorporated an antenna, a delay line and an amplifier assembly. The amplifier assembly incorporates a reflection amplifier switched to counteract occurrence of spontaneous oscillations therein. In each embodiment, the delay line functions as a storage element and selects a portion of the input signal generated in response to received illuminating radiation, the portion having a time duration of τ. Whilst the delay line 8 implemented as a MWDL is a convenient way of providing this function, any signal storing device or assembly with similar characteristics for storing a portion of the input signal could be used.

It will be appreciated by those skilled in the art that variations may be made to the circuits 1, 100 described in the foregoing without departing from the scope of the invention. Thus, whilst the delay line 8 is implemented as a MWDL in the embodiments described above, other types of delay line can be used. For example, other types of delay line can, if selective filtration is required, incorporate an array of bandpass filters supplied with an input signal and each provided with its own associated amplitude compression facilities. The filters can have their outputs summed into a delay line for providing a delayed output signal therefrom. In the case of an optical delay line incorporated into the circuits 1, 100, an input electrical signal applied thereto would need to be converted therein to an optical signal using a light source to provide corresponding optical radiation which would propagate along a light guiding path and would then be converted back to an electrical signal at an output of the optical delay line. In the case of a surface acoustic wave (SAW) delay line, it is compact and can provide a relatively large delay time τ approaching several μsec. However, it can only operate over a relatively low frequency bandwidth, for example from 10 MHz to 100 MHz. Whilst such a device is ideally suited for use in transponder applications, operation over a large bandwidth of several GHz is required in the case of radar chaff. Accordingly, other devices can be used in such applications such as bulk acoustic wave devices (BAW) which have a large bandwidth approaching a GHz or more. MWDLs are particularly advantageous because they have the benefit of a broad bandwidth and lower loss for operating frequencies up to 6 GHz.

Furthermore it will be appreciated that a reflector circuit of the invention could take many forms including one or more amplifying stages and one or more switches. It is further possible to use two separate antennae, a first antenna element for receiving the illuminating radiation 4 and a second antenna element for emitting the output radiation 6. For example in the embodiment shown in FIG. 3, the first antenna element could be connected directly to the input of the amplifier 108 and the second antenna element could be connected to the output of the amplifier 106 to provide a modified circuit. Such an arrangement eliminates the need for the switch 102 thereby reducing the switching losses of the circuit 100.

Figure 4:
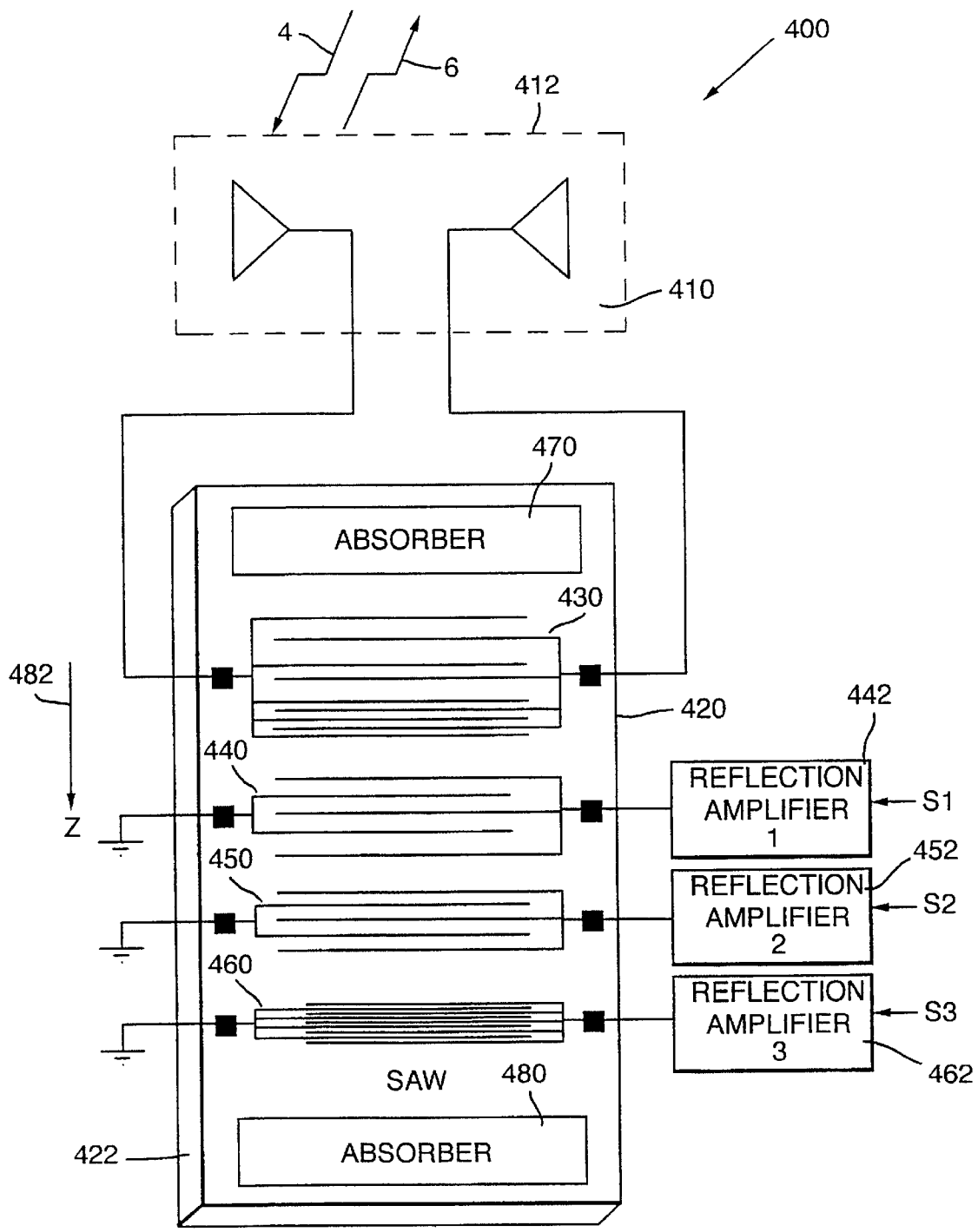
FIG. 4 is a schematic of a reflector circuit in accordance with a third embodiment of the invention.

Referring to FIG. 4, there is shown a third embodiment of a reflector circuit according to the invention indicated generally by 400. The circuit 400 incorporates a bow tie dipole antenna 410, shown within a dotted line 412, and a SAW device 420 incorporating a substrate 422 of single crystal quartz or lithium niobate. Interdigitated electrode structures are formed by selectively vacuum depositing an aluminium film onto an upper surface of the substrate 422, the electrode structures comprising a first chirped electrode structure 430 connected to the antenna 410, a second electrode structure 440 connected to its associated reflection amplifier 442, a third electrode structure 450 connected to its associated reflection amplifier 452, and a fourth electrode structure 460 connected to its associated reflection amplifier 462. Absorbing structures 470, 480 are also deposited onto the substrate 422, the absorbing structures comprising a film of material providing acoustic damping properties. The structures 430, 440, 450, 460 are electrically mutually isolated on the substrate 422.

As shown in FIG. 4, the absorbing structures 470, 480 and the electrode structures 430, 440, 450, 460 are arranged in a sequence in a z direction as indicated by an arrow 482, namely in sequence the absorbing structure 470, the first structure 430, the second structure 440, the third structure 450, the fourth structure 460 and finally the absorbing structure 480.

The fourth and third structures 460, 450 employ smaller inter-electrode spacing distances compared to the third and second structures 450, 440 respectively.

The chirped structure 430 employs an interdigitated electrode spacing which decreases progressively in the z direction. Since the second, third and fourth structures 440, 450, 460 each employ mutually different electrode spacings, this provides them with bandpass transducing characteristics for coupling between acoustic waves propagating along the upper surface in the z direction and electrical signals for the amplifiers 442, 452, 462 respectively. The bandpass characteristics are arranged to be centred at mutually different frequencies so that each structure 440, 450, 460 and its associated amplifier 442, 452, 462 are designated to provide amplification in mutually different frequency ranges. This provides the advantage that the amplifiers 442, 452, 462 can each be optimized to provide amplification over a narrower frequency range than required of the amplifier 10 in the circuits 1, 100; such optimum amplification reduces combined current consumption of the amplifiers 442, 452, 462 to less than that required by a single reflection amplifier providing comparable gain over a frequency range catered for in combination by the amplifiers 442, 452, 462. Moreover, a requirement for using a single wide band high gain amplifier is avoided; such an amplifier is particularly susceptible to spontaneous oscillation.

The reflection amplifiers 442, 452, 462 each employ a circuit configuration as shown for the amplifier 10 in FIG. 2. It is a characteristic of reflection amplifiers that their current consumption decreases for a given gain in an associated gain passband as the passband bandwidth is reduced. Useful gain in the amplifiers 442, 452, 462 is achievable, for example, for a power supply potential applied thereto of 2–3 volts and a current consumption of 15 $\mu$A per amplifier.

The reflection amplifiers 442, 452, 462 are periodically switched between a relatively more reflecting state and a relatively less reflecting state by control signals S1, S2, S3 respectively, applied thereto. The switching signals each have an associated time period set so that acoustic radiation emitted from each of the structures 440, 450, 460 which propagates back to the chirped structure 430 and is reflected back thereat, due to imperfect impedance matching of the structure 430 to the antenna 410, as return radiation reaches the respective structures 442, 452, 462 again when their associated amplifiers are in a less reflecting state which is insufficient to sustain spontaneous oscillation within the circuit 400. The absorbing structures 470, 480 are incorporated to counteract the formation of standing acoustic waves in the upper surface of the substrate 422.

The chirped structure 430 provides a relatively wide coupling bandwidth, namely in the order of 500 MHz, between electrical signals applied thereto from the antenna 410 and surface acoustic waves propagating on the substrate 422; this wide bandwidth arises from a spatially varied inter-electrode spacing employed in the chirped structure 430. This also results in a further characteristic that a position along the z direction at which acoustic wave is excited on the substrate 422 by an electrical signal from the antenna 410 applied to the structure 430 is dependent upon the frequency of the signal. In order to maintain an approximately similar propagation delay through the circuit 400 irrespective of signal frequency, the structures 430, 440, 450, 460 are positionally arranged as illustrated in FIG. 4.

Referring to FIG. 5, there is shown a response graph for the reflector circuit 400. The graph is indicated by 500. It incorporates a frequency axis 510 and a gain axis 520. A passband characteristic of the chirped structure 430 is indicated by 530; its bandwidth is wider than gain bandwidths 540, 550, 560 provided by the second, third and fourth structures 440, 450, 460 and their associated reflection amplifiers 442, 452, 462 respectively. The gain bandwidths 540, 550, 560 are mutually arranged so that the circuit 400 provides a relatively wide response bandwidth comparable to the passband characteristic 530.

Operation of the circuit 400 will now be described with reference to FIGS. 4 and 5. Continuous wave illuminating radiation 4 is received at the antenna 410 which converts it to a received signal which propagates along connections to the chirped structure 430. The received signal is coupled at the structure 430 to generate a first acoustic wave which propagates on the substrate 422 towards the absorbing structure 470 whereat it is acoustically absorbed, and a second acoustic wave which propagates towards the structures 440, 450, 460. Components of the received signal propagating on the substrate 422 whose associated frequencies lie within a passband of each of the structures 440, 450, 460 are coupled thereat and are amplified in their associated reflection amplifiers 442, 452, 462 respectively. When amplified, the components are recoupled to the substrate 422 and propagate as acoustic waves towards the absorbing structure 480, whereat they are absorbed, and back along the z direction to the chirped structure 430 whereat they are recombined to provide an output signal. The output signal propagates along the connections to the antenna 410 for emission as amplified radiation 6 therefrom.

The circuit 400 can be modified to provide a modified circuit in which electrode spacings employed in the structures 440, 450, 460 are not in sequence to spatially match that of the chirped structure 430; this can be used to reorder time of occurrence of individual frequency components present in the illuminating radiation 4. Moreover, the amplifiers 442, 452, 462 can also be switched so that frequency components present in the illuminating radiation 4 are selectively output in a specific sequence to the antenna 410, thereby encoding the output radiation 6 with frequency components encoded in a particular preferred sequence. This can be used for individual reflector circuit identification, for example where the circuit 400 is employed as a personnel-wearable identity tag.

Referring now to FIG. 6, there is illustrated a fourth embodiment of the invention, namely a reflector circuit indicated by 600. The circuit 600 is derived from the circuit 400; in the circuit 600, structures on a SAW substrate connected to associated reflection amplifiers are arranged at both sides of a central structure connected to an antenna; the structures are operative to couple between acoustic radiation on the substrate to electrical signals at the structures. This circuit 600 provides for more efficient utilisation of acoustic energy emitted onto the substrate compared to the circuit 400, thereby increasing circuit gain and reducing acoustic losses in absorbing structures incorporated onto the substrate.

In the circuit 600, there is incorporated a bow tie dipole antenna indicated by 610 and shown within a dotted line 612, and a SAW device indicated by 620 comprising a single crystal quartz or lithium niobate substrate 622. The device 620 includes an upper surface onto which acoustic absorbing structures 630, 632 are deposited at both extreme ends thereof. Centrally on the surface is deposited a relatively wide bandwidth interdigitated electrode structure 636 which is connected to the antenna 610. Closest to the structure 636 and at both sides thereof on the surface are included first and third interdigitated electrode structures 640, 660 connected to associated reflection amplifiers 642, 662. On the surface between the first structure 640 and the absorbing structure 630 is included a second interdigitated electrode structure 650 connected to its associated reflection amplifier 652. Likewise, on the surface between the third structure 660 and the absorbing structure 632 is included a fourth interdigitated electrode structure 670 connected to its associated reflection amplifier 672. The amplifiers 642, 652, 662, 672 each employ a circuit configuration as used in the reflection amplifier 10. The electrode structures 640, 650, 660, 670 provide a relatively narrower frequency bandwidth compared to the structure 636.

In operation, illuminating radiation is received at the antenna 610 which generates a received signal in response. The received signal passes to the structure 636 to generate surface acoustic waves which propagate on the surface in opposite directions towards the absorbing structures 630, 632. When the surface acoustic waves pass through the structures 640, 650, 660, 670 they are converted to electrical signals thereat which are amplified in respective amplifiers 642, 652, 662, 672 and then passed back when amplified to the structures 640, 650, 660, 670 for re-emission therefrom as surface acoustic waves. These waves propagate back to the structure 636 for emission as radiation from the antenna 610 or propagate to the absorbing structures 630, 632 for absorption thereat.

The amplifiers 642, 652, 662, 672 are each periodically switched between relatively more reflecting and relatively less reflecting states by applying control signals K1, K2, K3, K4 thereto respectively. This assists to counteract spontaneous oscillation arising in the circuit 600 as for circuit 1.

The structures 636, 640, 650, 660, 670 can employ chirped inter-electrode spacings or, alternatively, uniform inter-electrode spacing throughout, depending upon desired frequency response.

Since the circuit 600 is more efficient than the circuit 400, it can be operated with less power consumption, thereby making it especially suitable for use in battery operated transponders, for example personnel-wearable identity tags.

Referring next to FIG. 7, there is illustrated a fifth embodiment of the invention, namely a reflector circuit as indicated by 700. The circuit 700 comprises a bow tie dipole antenna indicated by 720 and shown within a dotted line 722, and a SAW device indicated by 750 which includes a substrate 752 of single crystal quartz or lithium niobate. Onto one surface of the substrate 752, there are formed an absorbing structure 760, first and second interdigitated electrode structures indicated by 770, 780 respectively and a reflecting structure 790. The first electrode structure 770 is connected to the antenna 720 and also to a first reflection amplifier 794 connected thereacross. The second electrode structure 780 is connected to its associated second reflection amplifier 796.

The structures 760, 770, 780, 790 are arranged in sequence on the substrate 752, namely the absorbing structure 760 at one end of the surface neighboured by the first electrode structure 770 neighboured in turn by the second electrode structure 780 neighboured by the reflecting structure 790 at another end of the surface remote from the absorbing structure 760.

Incorporation of the reflecting structure 790 improves efficiency of the circuit 700 because acoustic energy is not substantially absorbed within the structure 790 but is reflected therefrom. The reflecting structure 790 employs an abrupt spatial acoustic impedance transition to provide its reflecting characteristic.

The reflection amplifier 794, 796 are connected to receive respective control signals J0, J1 for switching them between relatively more reflecting and relatively less reflecting states. In the more reflecting state, the amplifiers 794, 796 provide amplification, whereas they provide reduced gain and are inhibited from spontaneously oscillating in the less reflecting state. The amplifiers 794, 796 employ a circuit configuration as illustrated in FIG. 2 for the amplifier 10.

Operation of the circuit 700 will now be described with reference to FIG. 7. At a time $\tau=0$, illuminating radiation 4 is received at the antenna 720 which generates a received signal in response. The signal is amplified by the first amplifier 794 and passes to the first structure 770 whereat it is coupled to the substrate 752 to excite surface acoustic waves thereon which propagate in one direction towards the absorbing structure 760, whereat they are absorbed, and also in another direction towards the second structure 780. A time period $\tau$ is required for signals converted to acoustic waves to propagate from the first structure 770 to the second structure 780; from a time $t=0$ to $t=\tau$, the control signal J0 is operative to cause the reflection amplifier 794 to amplify the received signal received as acoustic radiation at the structure 780, this is illustrated in a graph indicated by 850 incorporating a time axis 852 and a signal level axis 854. At a time $t=\tau$, the first reflection amplifier 794 is switched by its control signal J0 to a relatively less reflecting state and the second amplifier 796 is switched by its control signal J1 from its less reflecting state to its more reflecting state in which it provides amplification.

Acoustic waves received at the second structure 780 are converted to corresponding signals which are amplified by the second amplifier 796 thereby providing corresponding amplified signals. The amplified signals pass back to the second structure 780 whereat they excite acoustic waves which propagate:

(i) back to the first structure 770 and the absorbing structure 760 whereat they are absorbed because the first amplifier 794 provides a lossy load in its less reflecting state; and (ii) forward to the reflecting structure 790 whereat they are reflected and directed to propagate back towards the second structure 780.

A period of time of $2\tau$ is required for the surface acoustic waves to propagate from the second structure 780 to the reflecting structure 790 and back again; during a period of $t=\tau$ to $2\tau$, the control signal J1 sets the second amplifier 796 to provide amplification.

At a time $t=3\tau$, reflected surface acoustic waves are received back at the second structure 780 whereat they are amplified by the second reflection amplifier 796 during a period of $t=3\tau$ to $t=4\tau$; the control signal J1 sets the amplifier 796 to amplify during this period. Amplified surface acoustic waves are then emitted from the second structure 780 and propagate to the first structure 770 to reach it by $t=4\tau$. During a period of $t=4\tau$ to $t=5\tau$, the second reflection amplifier 796 is set by its control signal J1 to a less reflecting state and the first amplifier 794 is also set by its controlling input J0 to a more reflecting state in which it provides amplification.

When the acoustic waves are received at the first structure 770, they are converted to an output signal thereat which is reflectively amplified by the first amplifier 794 and then emitted as output radiation 6 from the antenna 720 during a period $t=4\tau$ to $t=5\tau$. At a time $t=5\tau$, the process described above is repeated; each cycle of the process requires a time period of $5\tau$.

In a modified version of the circuit 700, the amplifier 794 can be omitted for simplicity, although this reduces circuit 700 amplification.

The circuit 700 provides the advantage that the second amplifier 796 is given two opportunities during each cycle to provide amplification. Moreover, incorporation of the reflecting structure 790 in preference to an absorbing structure provides the circuit 700 with enhanced efficiency, thereby reducing its power consumption.

Furthermore, the circuit 700 can be further modified so that:
(i) the substrate 752 incorporates the reflecting structure 790 at both ends thereof;
(ii) the first structure 770 is formed in a central area of the substrate 752 equidistant between the two reflecting structures; and
(iii) there are included two second structures 780 connected to associated reflecting amplifiers, the structures formed symmetrically at both sides of the first structure and interposed between the first structure and the reflecting structure.

This provides the advantage of further enhancing operating efficiency.

Although the circuits 400, 600, 700 are implemented using surface acoustic wave structures, they can alternatively be implemented using bulk acoustic wave structures, thereby enhancing circuit frequency response range to several GHz.

I claim:

1. A reflector circuit for receiving illuminating radiation and for emitting corresponding amplified output radiation, the circuit comprising:
   a) an antenna assembly for receiving the illuminating radiation, and for providing a corresponding received signal; and
   b) processing means for amplifying and storing a portion of the received signal for a period of time for use in generating a corresponding output signal for emission from the antenna assembly as the output radiation, the processing means incorporating reflection amplifying means for amplifying the portion of the received signal.

2. The circuit according to claim 1, wherein the processing means incorporates gain controlling means for switching the reflection amplifying means alternately between a relatively more reflecting state and a relatively less reflecting sate, thereby operable to counteract spontaneous closed-loop oscillation within the circuit.

3. The circuit according to claim 2, wherein the reflection amplifying means comprises a reflection amplifier incorporating a transistor configured by means of a feedback arrangement for operating within different portions of the transistor's current/voltage characteristics to operate in the relatively more reflecting state and the relatively less reflecting state.

4. The circuit according to claim 2, wherein the processing means employs storing means for delaying signals propagating to and from the reflection amplifying means so that the gain controlling means is provided with sufficient time to periodically reduce gain provided by the reflection amplifying means to counteract the spontaneous oscillation in the circuit.

5. The circuit according to claim 4, wherein the storing means is arranged for storing a signal within it for a period $\tau$ and then output it, and wherein the gain controlling means is arranged for operating at a rate related to an integer number of the period $\tau$.

6. The circuit according to claim 1, wherein the processing means is operable for providing frequency selective amplification in response to a magnitude of components present in the illuminating radiation.

7. The circuit according to claim 6, wherein the processing means is arranged for providing amplification which progressively reduces in response to increased magnitude of the components in the illuminating radiation.

8. The circuit according to claim 1, wherein the processing means incorporates storing means for storing the portion of the received signal for use in generating the output signal, the storage means being connected in a signal path between the reflection amplifying means and the antenna assembly.

9. The circuit according to claim 8, wherein the storing means incorporates a magnetostatic wave device arranged for storing the portion of the received signal for use in generating the output signal, and for providing the frequency selective response.

10. The circuit according to claim 9, wherein the magnetostatic device provides a signal propagation path through an epitaxial yttrium iron garnet magnetic film having a thickness in a range of 10 $\mu$m for storing the portion of the received signal and for providing the frequency selective response.

11. The circuit according to claim 8, wherein the processing means incorporates transmission amplifying means and switching means for providing amplification to counteract signal propagation losses occurring in the storing means.

12. The circuit according to claim 8, wherein the processing means incorporates switching means for alternately switching between the portion of the received signal in the processing means for use in generating the output signal, and applying the output signal to the antenna assembly for emission therefrom as the output radiation.

13. The circuit according to claim 12, wherein the switching means is operable for counteracting spontaneous closed-loop oscillation within the circuit.

14. The circuit according to claim 12, wherein the storing means is arranged for storing a signal within it for a period $\tau$ and then output it, and wherein the switching means is arranged for operating at a rate related to an integer number of the period $\tau$.

15. The circuit according to claim 1, wherein the antenna assembly comprises a first antenna element for receiving the illuminating radiation and a second antenna element for emitting the output radiation, said first and second antenna elements being mutually spatially separate.

16. The circuit according to claim 1, wherein the antenna assembly incorporates at least one of a patch antenna, a bow-tie dipole antenna, and a traveling wave antenna.

17. The circuit according to claim 1, wherein the processing means incorporates modulating means for applying modulation to the portion of the received signal, thereby modulating the amplified output radiation with data.

18. The circuit according to claim 1, wherein the processing means incorporates acoustic wave delaying means incorporating first transducing means for coupling the received signal to excite input acoustic radiation in the delaying means, and for coupling output acoustic radiation from the delaying means to provide the output signal; and second transducing means for coupling acoustic radiation from the delaying means to provide at least one input signal to the reflection amplifying means for reflective amplification thereat to provide amplified reflected signals to excite acoustic signals in the delaying means for use in generating the output signal.

19. The circuit according to claim 18, wherein the delaying means incorporates at least one absorbing structure for absorbing the acoustic radiation propagating in the delaying means, and at least one reflecting structure for reflecting the acoustic radiation propagating in the delaying means.

20. The circuit according to claim 18, wherein the second transducing means comprises a plurality of transducers, each transducer connected to its own associated reflection amplifier arranged to provide amplification of the acoustic radiation propagating in the delaying means.

21. The circuit according to claim 20, wherein the first transducing means incorporates a chirped interdigitated electrode structure for providing an enhanced transducing frequency response.

22. The circuit according to claim 20, wherein the transducers and their associated amplifiers are arranged for providing amplification over mutually different frequency ranges.

23. The circuit according to claim 20, wherein the delaying means incorporates reflecting means for reflecting the acoustic radiation propagating in the delaying means, the second transducing means being spatially interposed between the reflecting means and the first transducing means and arranged for amplifying acoustic radiation subsequently reflected from the reflecting means.

24. The circuit according to claim 20, wherein each reflection amplifier is arranged to be periodically switched between a relatively less reflecting state and a relatively more reflecting state, thereby counteracting spontaneous oscillation within the circuit.

25. The circuit according to claim 18, wherein the second transducing means is arranged substantially spatially symmetrically about the first transducing means, thereby receiving acoustic energy emitted in more than one direction from the first transducing means.

26. A pseudo passive transponder tag including a reflector circuit for receiving illuminating radiation and for emitting corresponding amplified output radiation, the circuit comprising:

a) an antenna assembly for receiving the illuminating radiation, and for providing a corresponding received signal; and b) processing means for amplifying and storing a portion of the received signal for a period of time for use in generating a corresponding output signal for emission from the antenna assembly as the output radiation, the processing means incorporating reflection amplifying means for amplifying the portion of the received signal.

27. Radar chaff including a reflector circuit for receiving illuminating radiation and for emitting corresponding amplified output radiation, the circuit comprising:

a) an antenna assembly for receiving the illuminating radiation, and for providing a corresponding received signal; and b) processing means for amplifying and storing a portion of the received signal for a period of time for use in generating a corresponding output signal for emission from the antenna assembly as the output radiation, the processing means incorporating reflection amplifying means for amplifying the portion of the received signal.

28. A method of providing amplified output radiation in response to receiving illuminating radiation, comprising the steps of:

a) receiving the illuminating radiation and providing a corresponding received signal;

b) amplifying and storing a portion of the received signal for a period of time;

c) generating an output signal from the portion of the received signal after storage;

d) emitting the output signal as the output radiation; and e) amplifying the portion of the received signal.

* * * * *